United States Patent [19]

Miwa et al.

[11] Patent Number: 5,066,507
[45] Date of Patent: Nov. 19, 1991

[54] METHOD FOR REMOVING ROOTS FROM CORMATOSE PLANT BODIES

[75] Inventors: Yoshiyuki Miwa; Hiroshi Kodama; Takuya Murase, all of Tokyo; Sadao Shikae, Kagoshima; Masaya Nakagawa; Tsutomu Kabumoto, both of Tokyo, all of Japan

[73] Assignees: Waseda University; Mitsubishi Jukogyo Kabushiki Kaisha, both of Tokyo, Japan

[21] Appl. No.: 482,628

[22] Filed: Feb. 20, 1990

[30] Foreign Application Priority Data

Feb. 22, 1989 [JP] Japan .................................. 1-40382
Jul. 31, 1989 [JP] Japan .................................. 1-196935

[51] Int. Cl.$^5$ ............................................. A23N 15/00
[52] U.S. Cl. ......................................... 426/481; 99/640
[58] Field of Search ................... 426/481, 483; 99/640, 99/585

[56] References Cited

U.S. PATENT DOCUMENTS 1,659,555 2/1928 Ayars ...................................... 99/640
3,942,428 3/1976 Clausen ................................. 99/640
4,240,446 12/1980 Raymond .............................. 99/640

FOREIGN PATENT DOCUMENTS 397923 7/1924 Fed. Rep. of Germany .
3605639 9/1986 Fed. Rep. of Germany .

*Primary Examiner*—George Yeung
*Attorney, Agent, or Firm*—Fleit, Jacobson, Cohn, Price, Holman & Stern

[57] ABSTRACT

A method for mechanically removing roots from harvested cormatose plant bodies using a special root removing arrangement comprises supplying the harvested cormatose plant body (3) in between two parallel spaced horizontal rollers (1,2) while they are rotating in opposite directions relative to each other so that their peripheral or opposing adjacent inner sides are moving upwards, or in the same rotational direction so that one of these peripheral surfaces on opposing adjacent inner sides is moving upwards, in order that the plant bodies roll on the rollers and become balanced and oriented substantially axially of the rollers, changing the rotational mode of the rollers into a counter rotation mode so that their peripheral surfaces on the opposing inner sides are moving downwards, drawing the beard-like roots (4) of each plant body (3) into the gap between the rollers, forcing each plant body away from the rollers by a plant body thrusting mechanism (5,6,7) to cause the roots to be plucked from the plant body, and discharging the so disrooted plant body out of the root removing arrangement. The method provides for automatic mechanical removal of the beard-like roots from harvest cormatose plant bodies and attains high labor performance at an economization of energy while reducing the danger of injury and permitting realization of aseptic operations.

3 Claims, 3 Drawing Sheets

METHOD FOR REMOVING ROOTS FROM CORMATOSE PLANT BODIES

BACKGROUND OF THE INVENTION

The present invention relates to a method for removing roots from bulbous or cormatose plants, in particular, by means of mechanical work.

Heretofore, a farm work of root-removal or disrooting of cormatose plants has been realized, in general, by hand work of farm laborers by handling the plant body or placing it on a chopping board one by one and cutting off the roots using a knife etc.

Upon the remarkable progress in the biotechnology in recent years, an intense expectation has arisen for realizing an industrial agriculture which allows a considerable increase in the harvest amount while spending man-labor. For such industrial agriculture, mechanization of various farm works is necessary and, in addition, aseptic operations should, in most cases, be incorporated in order to eliminate infections during planting and cultivating on, such as, an agar culture medium which may probably be employed in such industrial agriculture.

In harvesting cormatose plants, such as, lily, fritillary and so on, removal of beard-like roots (disrooting) from the collected plant bodies is important. Hitherto, such disrroting has not been successfully mechanized and was performed exclusively by hand work of farm laborers spending extensive time at a low labor efficiency accompanied with considerable danger of unjury due to handling of a knife etc. Furthermore, there is a high probability of transference of phytopathogenic bacteria from the laborers' body to the plant, if a laborers' work has to be interposed in such mechanized works for disrooting, which has been a large obstacle to such mechanization.

BRIEF SUMMARY OF THE INVENTION

An object of the present invention is to obviate the difficulties mentioned above and to propose a mechanical method for removing roots from cormatose plant bodies which offers high work performance and relieves danger of injury of laborer and prevents transfer of phytopathogenic bacteria from the laborer to the plant.

Thus, the present invention provides a method for mechanical removal of beard-like roots from harvested cormatose plant bodies by employment of a special root removing arrangement which comprises supplying the harvested cormatose plant body in between two parallel laid rollers while they are rotating in the same rotational direction or in counter rotating directions to each other so that their opposing inner sides are moving upwards, in order to let the plant body roll on the rollers and become balanced, substantially axially with respect to the orientation of the rollers, changing the direction of rotation of the rollers into a counter rotation relative to each other so that their opposing inner sides are moving downwards, in order to draw the beard-like roots of the plant body into the roller gap produced by a suitable spacing between the rollers, forcing the plant body aside from the rollers by means of a plant body thrusting mechanism to cause the roots to be plucked from the plant body; and discharging the disrooted plant body out of the root removing arrangement.

In the root removal method according to the present invention, when the rotational direction of the two parallel rollers mounted to leave a small gap between them is the same or, when they are counter rotating relative to each other so that their opposing inner sides are moving upwards, a plant body of a cormatose plant placed on the intersticial portion of the rollers will roll thereon and soon take a balanced or stable posture with the plant stem or plant axis extending in the axial direction of the rollers. By changing the rotational direction of the two rollers from this state into a root-involution mode in which they counter-rotate so that said opposing inner sides of the rollers are moving downwards, the beard-like roots of the plant body will be rolled into the roller gap, between the rollers and subjected to tearing by the friction force of the rotating rollers. If, in this condition, the plant body is pushed aside, i.e. an axial direction of the rollers by means of a plant body thrusting mechanism, the beard-like roots which have been rolled into the roller gap will now be plucked off from the plant body retained on the parallel rollers and the disrooted plant bodies will fall down into, a collector bunker disposed outside the root removing arrangement.

Since the plant body, i.e. the stem and the bulb, is sufficiently larger than the beard-like roots, it will, at a quite high probability, be retained on the rollers without being drawn into the gap between the rollers. By constructing the roller pair asymmetrically so that one has a larger diameter than the other, the possibility of rolling small size plant bodies into the roller gap can be decreased even farther.

If the diameters of the rollers are excessively large with respect to the size of the plant body, the possibility of rolling the plant bodies into the roller gap becomes intolerably high. Such a danger can be avoided by selecting the diameters of the rollers within a suitable range and determining the ratio of the two asymmetrical roller diameters at an adequate value, since the diameter of the plant body is quite larger than that of the beard-like root.

DETAILED DESCRIPTION OF PREFERRED EMBODIMENTS

The invention will now be described in detail with reference to the accompanying drawings and by way of an Example of root removal of a bulbous lily.

Figure 1:
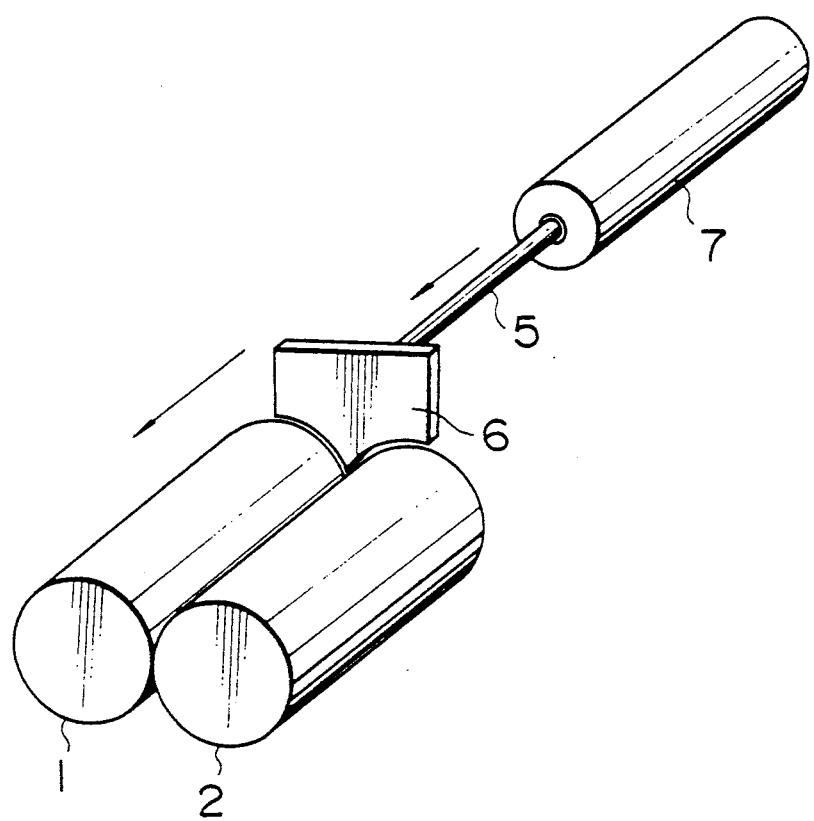
FIG. 1 is a perspective view of an embodiment of the root removing arrangement according to the present invention.
Figure 2:
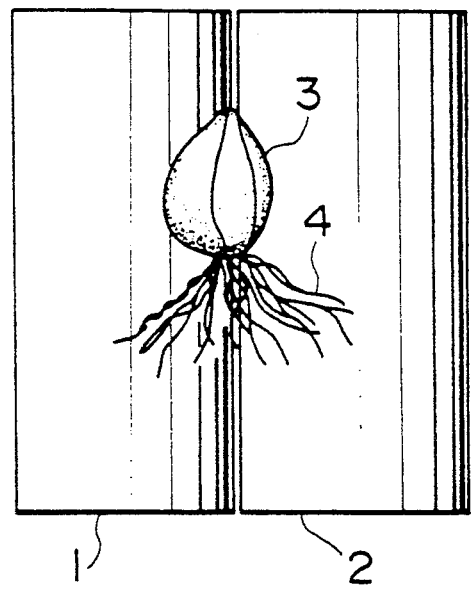
FIG. 2 illustrates a typical state of operation of the root removing arrangement having the rollers rotating in the same direction, with a plant body of a lily supplied on the rollers and kept rolling thereon to take an axial balanced posture with beard-like roots not being rolled into the roller gap.
Figure 3:
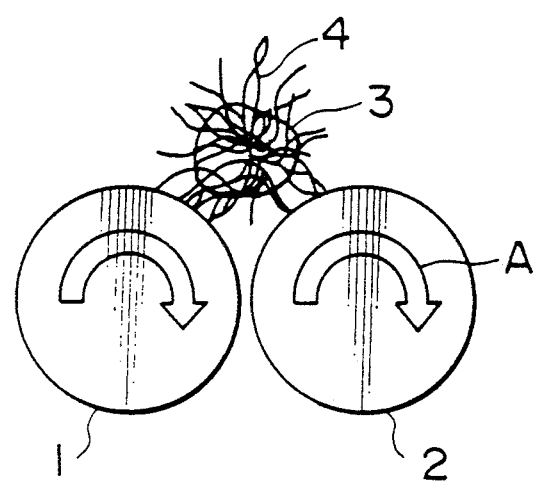
FIG. 3 is a side view of FIG. 2.

A root removing arrangement employed in this Example is illustrated in FIGS. 1 to 3, in which a plant body of a bulbous lily having beard-like roots is supplied on a pair of rollers 1 and 2. These rollers 1 and 2 are rotatably disposed parallel to each other leaving a roller of an adequate spacing therebetween and are each lined by a coating of hard rubber.

In the first operation step of the arrangement, the roller pair is run in a parallel rotation mode, namely, rotating in the same direction as shown in FIG. 3 by the arrows A. The plant body 3 to be subjected to root removal is supplied in this state onto the pair of rollers in their intersticial portion. The plant body 3 rolls between the two rollers 1 and 2 and soon takes its balanced or stable posture with its plant axis extending in the axial direction of the rollers, even though it is supplied in any voluntary posture onto the roller pair. This brings about the same result, whether the rollers are rotated clockwise or clockwise.

Figure 4:
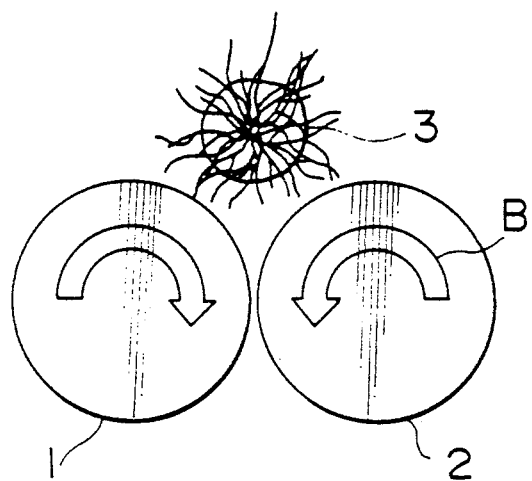
FIG. 4 illustrates schematically the state of operation of the root removing arrangement of FIG. 2 just after the rotation mode of the roller pair is changed over into a root-involution mode.
Figure 5:
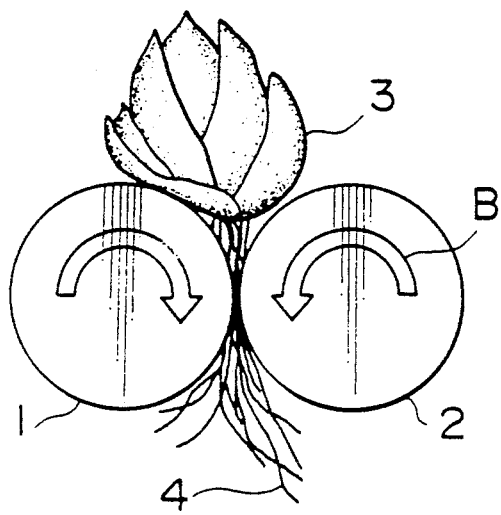
FIG. 5 illustrates schematically a state after the condition shown in FIG. 4, in which the beard-like roots have been rolled into the roller gap before they are plucked off from the bulb.

After the stable posture of the plant body 3 has been reached, the rotation of one of the rollers 2 is reversed in the second operation step to rotate counterclockwise so that the internally opposing sides of the pair of rollers 1 and 2 are both moving downwards, as shown in FIG. 4 by the arrows B. By this operation of the rollers, the flexible beard-like roots 4 are drawn into the roller gap by the friction force of the rollers, while the bulb or corm and the stem of the plant are retained on the rollers 1 and 2 since they are large enough to withstand such involution force.

Then, a plant body thrusting mechanism in a form of, for example, an axially slidable piston 5 and a cylinder 7 therefor as shown in FIG. 1 is actuated in the third operation step, so as to push the plant body forward by a sweeper plate 6 arranged at the end of the piston 5. This operation causes the beard-like roots drawn in between the two rollers to be plucked from the bulb 3 and the thus disrooted plant body is swept off from the rollers into a suitable collector means outside the root removing arrangement.

While the Example herein suggests use of rollers coated by hard rubber in order to provide enough friction to be imparted to beard-like roots of larger thickness, it is feasible to select other adequate materials to meet each specific requirement of each application taking into account the strength, flexibility, hardness and so on of the roots to be removed. The roller diameter should be determined suitably for plants to be treated, as suggested previously, to adapt to their size, hardness flexibility and so on, together with suitable adjustment of distance or spacing of the roller gap, rotation speed of the rollers, diameter ratio of the two rollers of asymmetrical diameters if incorporated and so on.

The plant body thrusting mechanism can be realized by any other suitable means and can be actuated by, an electric motor or the like.

According to the novel method of the above present invention, it is now possible, as illustrated in the Example, to mechanize works for root removal for various cormatose plants that were heretofore carried out only by hand work of farm laborers. Thus, it offers high work efficiency with economization of energy and improvement of safety to secure against injury due to accidents, in addition to providing complete aseptic operation. Therefore, the present invention can be applied advantageously not only to conventional agricultural works but also to industrial agriculture operations and with large amount of plant bodies and even to "plant factories" in the future.

We claim:

1. A method for mechanically removing beard-like roots from harvested cormatose plant bodies using a root removing device, comprising:

supplying the harvested cormatose plant bodies in between two rollers first rotating about substantially horizontal parallel axes with a roller gap between the outer peripheral surfaces of the rollers, the rollers rotating in relative directions with respect to each other so that at least one of the peripheral surfaces of the rollers on opposing adjacent inner sides is moving upwards, in order to allow each plant body to roll on the rollers and become balanced and oriented substantially axially with respect to the rollers;

changing the relative rotation of at least one of the rollers so that the peripheral surfaces on the opposing adjacent inner sides of both rollers are moving downwards;

drawing the beard-like roots of each plant body into the roller gap maintained by a suitable spacing of the rollers;

forcing each plant body away from the rollers by means of a plant body thrusting mechanism to cause the roots to be plucked from the plant body; and discharging the so disrooted plant body out of the root removing device.

2. A method as claimed in claim 1 wherein both rollers are first rotated in the same rotational direction.

3. A method as claimed in claim 1 wherein both rollers are first rotated in opposite rotational directions.

* * * * *